(12) United States Patent
Kim et al.

(10) Patent No.: US 11,398,654 B2
(45) Date of Patent: Jul. 26, 2022

(54) SECONDARY BATTERY PACK INCLUDING HEAT DISSIPATION PLATE

(71) Applicant: LG CHEM, LTD., Seoul (KR)

(72) Inventors: Jae-Sang Kim, Daejeon (KR); Kun-Joo Yang, Daejeon (KR); Seog-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 44 days.

(21) Appl. No.: 16/766,972

(22) PCT Filed: Aug. 29, 2019

(86) PCT No.: PCT/KR2019/011092
§ 371 (c)(1),
(2) Date: May 26, 2020

(87) PCT Pub. No.: WO2020/050551
PCT Pub. Date: Mar. 12, 2020

(65) Prior Publication Data
US 2020/0321669 A1 Oct. 8, 2020

(30) Foreign Application Priority Data

Sep. 4, 2018 (KR) .......................... 10-2018-0105476

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/6235* (2015.04); *H01M 10/643* (2015.04); *H01M 2220/30* (2013.01)

(58) Field of Classification Search
CPC ............ H01M 10/6554; H01M 10/613; H01M 10/6235; H01M 10/643; H01M 2220/30;
(Continued)

(56) References Cited

U.S. PATENT DOCUMENTS 6,636,016 B2  10/2003 Tanaka et al.
2003/0017383 A1* 1/2003 Ura ................... H01M 10/6555
429/157
(Continued)

FOREIGN PATENT DOCUMENTS

CN    102110795 A    6/2011
EP    2343752 A2    7/2011
(Continued)

OTHER PUBLICATIONS

Extended European Search Report issued in corresponding European Patent Application No. 19857865.0 dated Feb. 1, 2021.
(Continued)

*Primary Examiner* — Lisa S Park
(74) *Attorney, Agent, or Firm* — Morgan, Lewis & Bockius LLP

(57) ABSTRACT

Disclosed is a secondary battery pack including a plurality of cylindrical battery cells with improved cooling efficiency. The secondary battery pack includes a plurality of cylindrical battery cells having electrode terminals formed at both ends thereof; a pack case having an accommodation portion formed to accommodate the plurality of cylindrical battery cells therein and at least one exposing portion perforated from an inside to an outside thereof; at least one heat dissipation plate configured in the form of a metal plate and located at the exposing portion of the pack case so that at least a portion thereof is exposed out through the exposing portion of the pack case; and a heat transfer pad having a thermally conductive material in a solid state and interposed (Continued)

between the plurality of cylindrical battery cells and the heat dissipation plate.

19 Claims, 8 Drawing Sheets

(51) Int. Cl.
 *H01M 10/6235* (2014.01)
 *H01M 10/643* (2014.01)

(58) Field of Classification Search
 CPC ............. H01M 50/548; H01M 50/213; H01M 10/653; H01M 50/502; Y02E 60/10
 See application file for complete search history.

(56) References Cited

U.S. PATENT DOCUMENTS

| | | | |
|---|---|---|---|
| 2008/0259569 A1* | 10/2008 | Lin | H05K 7/20409 361/704 |
| 2008/0292949 A1* | 11/2008 | Shen | H01M 10/625 429/120 |
| 2010/0134974 A1* | 6/2010 | Nguyen | H01G 9/155 361/689 |
| 2010/0310919 A1 | 12/2010 | Villarreal | |
| 2012/0100400 A1 | 4/2012 | Kang et al. | |
| 2013/0034768 A1 | 2/2013 | Tsuchiya et al. | |
| 2014/0234686 A1* | 8/2014 | Sweney | H01M 50/24 429/120 |
| 2014/0272516 A1* | 9/2014 | Tennison | H01M 10/6555 429/120 |
| 2014/0272517 A1 | 9/2014 | Glasgow et al. | |
| 2015/0079444 A1* | 3/2015 | Baumgartner | H01M 10/6551 429/120 |
| 2017/0278641 A1 | 9/2017 | Lee et al. | |
| 2019/0214694 A1 | 7/2019 | Yang et al. | |

FOREIGN PATENT DOCUMENTS

| | | |
|---|---|---|
| JP | 2002-216726 A | 8/2002 |
| JP | 2005-285456 A | 10/2005 |
| JP | 2006-092935 A | 4/2006 |
| JP | 2008-251262 A | 10/2008 |
| JP | 2013-33686 A | 2/2013 |
| JP | 2015-125930 A | 7/2015 |
| JP | 2017-037772 A | 2/2017 |
| JP | 6261449 B2 | 1/2018 |
| KR | 10-2010-0135601 A | 12/2010 |
| KR | 10-1029353 B1 | 4/2011 |
| KR | 10-2016-0022237 A | 2/2016 |
| KR | 10-1724770 B1 | 4/2017 |
| KR | 10-2017-0060451 A | 6/2017 |
| KR | 10-2017-0125629 A | 11/2017 |

OTHER PUBLICATIONS

Office Action dated May 17, 2021, issued in corresponding Japanese Patent Office Action No. 2020-520620.
International Search Report issued in corresponding International Patent Application No. PCT/KR2019/011092, dated Dec. 26, 2019.

* cited by examiner

SECONDARY BATTERY PACK INCLUDING HEAT DISSIPATION PLATE

TECHNICAL FIELD

The present disclosure relates to a secondary battery pack including a heat dissipation plate, and more particularly, to a secondary battery pack including a plurality of cylindrical battery cells with improved cooling efficiency.

The present application claims priority to Korean Patent Application No. 10-2018-0105476 filed on Sep. 4, 2018 in the Republic of Korea, the disclosures of which are incorporated herein by reference.

BACKGROUND ART

A secondary battery is highly applicable to various products and has electrical characteristics with high energy density. The secondary battery is applied not only to portable electronic devices but also to electric vehicles, hybrid electric vehicles, power storage devices, and the like, driven by an electric driving source.

The secondary battery is attracting attention as a new energy source for improving eco-friendliness and energy efficiency since the use of fossil fuels is significantly reduced and no by-product is generated during the use of energy.

A secondary battery pack applied to an electric vehicle is configured such that a plurality of secondary battery packs, each having a plurality of secondary battery cells, are electrically connected to each other to obtain a high output. In addition, each secondary battery cell includes positive and negative electrode current collectors, a separator, an active material, an electrolyte, and the like as an electrode assembly, and may be repeatedly charged and discharged by an electrochemical reaction between the components.

Meanwhile, with the recent utilization as an energy storage source and the increased need for a large capacity structure, the demand for the secondary battery pack in which a plurality of secondary battery cells are connected in series and/or in parallel is increasing.

Moreover, in recent years, even a small secondary battery pack tends to have a high output and a high capacity due to the demand of consumers.

However, if a plurality of secondary battery cells are mounted in one small secondary battery pack, the density of secondary battery cells is very high due to a limited space. Also, since the amount of heat generated from the secondary battery cell is proportional to the square of the current, the temperature of the secondary battery cell tends to rapidly increase during high rate discharge.

Further, it is important for the small secondary battery pack to easily dissipate heat generated in each secondary battery cell. That is, if heat generated in the charging and discharging process is not effectively removed, thermal accumulation may occur. Accordingly, battery cells exposed to a high temperature environment in the long term are deteriorated faster, thereby rapidly decreasing a lifespan of the secondary battery pack.

Therefore, there is a need for an effective cooling technology to increase the life characteristics of the secondary battery pack.

DISCLOSURE

Technical Problem

The present disclosure is designed to solve the problems of the related art, and therefore the present disclosure is directed to providing a secondary battery pack, which includes a plurality of cylindrical battery cells with improved cooling efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a secondary battery pack, comprising:

a plurality of cylindrical battery cells having electrode terminals formed at both ends thereof;

a pack case having an accommodation portion formed to accommodate the plurality of cylindrical battery cells therein and at least one exposing portion perforated from an inside to an outside thereof;

at least one heat dissipation plate configured in the form of a metal plate and located at the exposing portion of the pack case so that at least a portion thereof is exposed out through the exposing portion of the pack case; and a heat transfer pad having a thermally conductive material in a solid state and interposed between the plurality of cylindrical battery cells and the heat dissipation plate.

Also, the heat transfer pad may include an upper pad formed to surround an upper portion of the plurality of cylindrical battery cells and a lower pad formed to surround a lower portion of the plurality of cylindrical battery cells.

Moreover, the upper pad and the lower pad may respectively have a curved portion having a protruding structure protruding in an inner direction of the secondary battery pack to be interposed between the plurality of cylindrical battery cells and a recess structure dented in an outer direction of the secondary battery pack.

In addition, the plurality of cylindrical battery cells may be spaced apart from each other by a predetermined distance and arranged in one direction.

Further, the protruding structures of the curved portions respectively provided to the upper pad and the lower pad may be located to face each other and partially connected to each other.

Also, a convex portion formed at a location corresponding to the protruding structure of the curved portion and ridged in the inner direction of the secondary battery pack may be formed at an inner surface of the heat dissipation plate.

Moreover, an insert portion dented in the inner direction of the secondary battery pack may be formed at an outer surface of the heat transfer pad facing the heat dissipation plate so that the convex portion is inserted therein.

In addition, the pack case may include an upper case and a lower case at which the exposing portion is formed, respectively.

Further, the upper case may have an inner structure formed to accommodate and cover the upper portion of the plurality of cylindrical battery cells therein.

Also, the lower case may have an upper surface coupled to a lower surface of the upper case and have an inner structure formed to accommodate and cover the lower portion of the plurality of cylindrical battery cells.

Moreover, the heat dissipation plate may include a first heat dissipation plate and a second heat dissipation plate, and an insert groove dented inward may be formed at an inner side of the exposing portion of each of the upper case and the lower case so that an outer periphery of each of the first heat dissipation plate and the second heat dissipation plate is inserted and fixed therein.

In addition, a support portion protruding outward may be formed at each of the upper pad and the lower pad to contact an inner surface of each of the first heat dissipation plate and the second heat dissipation plate.

Also, the outer periphery of the heat dissipation plate may be formed to have a greater plate thickness than a center portion of the heat dissipation plate.

Moreover, at least one rib may be formed at the exposing portion to extend from one side to the other side of an opening perforated in the exposing portion.

In addition, the secondary battery pack may further comprise a connection bus bar provided in contact with the electrode terminals formed at the plurality of cylindrical battery cells to electrically connect the plurality of cylindrical battery cells.

Further, the heat transfer pad may have an extending portion extending outward to cover a bonding portion between the connection bus bar and the electrode terminals of the plurality of cylindrical battery cells.

Also, a placing member may be formed at the accommodation portion of the pack case so that the plurality of cylindrical battery cells are mounted thereto, and a plurality of concave structures dented corresponding to an outer shape of ends of the plurality of cylindrical battery cells at which the electrode terminals are provided may be formed at the placing member.

Further, in another aspect of the present disclosure, there is also provided an electronic device, comprising the secondary battery pack.

In addition, in still another aspect of the present disclosure, there is also provided a power tool, comprising the secondary battery pack.

Advantageous Effects

According to an embodiment of the present disclosure, since the secondary battery pack of the present disclosure includes a heat dissipation plate and a pack case having an exposing portion for exposing at least a portion of the heat dissipation plate to the outside, it is possible to effectively dissipate the heat generated at the cylindrical battery cells to the outside.

Also, according to an embodiment of the present disclosure, since the heat transfer pad made of a thermal conductive material is interposed between the plurality of cylindrical battery cells and the heat dissipation plate, the heat generated from the plurality of cylindrical battery cells accommodated inside the secondary battery pack may be effectively transferred to the heat dissipation plate through the heat transfer pad. Accordingly, the cooling effect of the secondary battery pack may be maximized.

Moreover, according to another embodiment of the present disclosure, since the protruding structures of the curved portions respectively provided to the upper pad and the lower pad of the present disclosure are positioned to face each other and are formed to be partially connected to each other, the contact area of the heat transfer pads surrounding the outer surfaces of the cylindrical battery cells may be increased. Also, since the gap between the plurality of cylindrical battery cells may be filled with the heat transfer pad, it is possible to prevent the cylindrical battery cells from being overheated due to stagnant heat caused by the air in the gap.

In addition, according to still another embodiment of the present disclosure, since a convex portion is formed at the inner surface of the heat dissipation plate, the heat transfer path between the heat transfer pad and the heat dissipation plate may have a uniform length. That is, a cylindrical battery cell located at the center among the plurality of cylindrical battery cells may be more easily deteriorated since heat is accumulated more therein compared to cylindrical battery cells located relatively outside. Accordingly, since the convex portion is formed at the heat dissipation plate of the present disclosure, it is possible to increase the heat dissipation speed of the cylindrical battery cell located at the center, thereby effectively achieving heat balance between the plurality of cylindrical battery cells. Also, this may effectively extend the lifespan of secondary battery pack.

Also, according to still another embodiment of the present disclosure, since the heat dissipation plate is inserted into and fixed to the insert groove formed at the inner surface of the exposing portion of the pack case, the heat dissipation plate may be fixed without a separate fixing member. Accordingly, the material cost is reduced when manufacturing the secondary battery pack. In addition, since the heat dissipation plate inserted into the pack case is not easily separated even when an external shock is applied to the secondary battery pack, the durability of the secondary battery pack may be greatly improved.

Moreover, according to still another embodiment of the present disclosure, if the outer periphery of the heat dissipation plate formed relatively thicker than the center portion thereof has a shape inserted into the pack case, the rigidity of the pack case may be reinforced. That is, since the outer periphery of the heat dissipation plate is configured to support the inside of the pack case, it is possible to effectively prevent the pack case from deforming due to an external pressure. Further, the heat dissipation plate may increase the heat capacity for absorbing heat as much as the size of the thickened outer periphery. Also, the contact area with the pack case is increased, thereby effectively dissipating the heat generated from the plurality of cylindrical battery cells.

In addition, according to still another embodiment of the present disclosure, since at least one rib is formed at the exposing portion of the pack case, the rigidity of the exposing portion of the pack case may be reinforced, and a user may be prevented from directly contacting the heat dissipation plate located at the exposing portion of the pack case. Accordingly, the user of the secondary battery pack may be prevented from being burned while using the secondary battery pack, thereby increasing the safety of the secondary battery pack.

Furthermore, according to still another embodiment of the present disclosure, since the heat transfer pad has a extending portion extending outward to cover a portion where the connection bus bar and the electrode terminals of the plurality of cylindrical battery cells are bonded to each other, the heat generated at the bonded portion of the connection bus bar and the electrode terminal, which has relatively higher heat generation, may be effectively transferred to the heat dissipation plate through the extending portion. Accordingly, the cooling effect of the secondary battery pack may be further increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
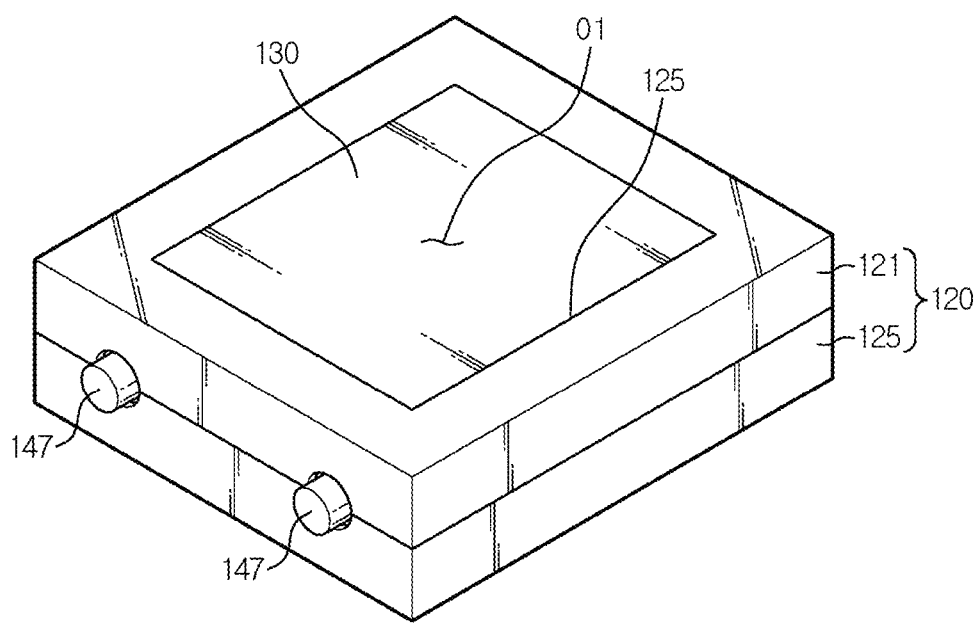
FIG. 1 is a perspective view schematically showing a secondary battery pack according to an embodiment of the present disclosure.

FIG. 1 is a perspective view schematically showing a secondary battery pack according to an embodiment of the present disclosure. Also, FIG. 2 is an exploded perspective view schematically showing some components of the secondary battery pack according to an embodiment of the present disclosure.

Figure 2:
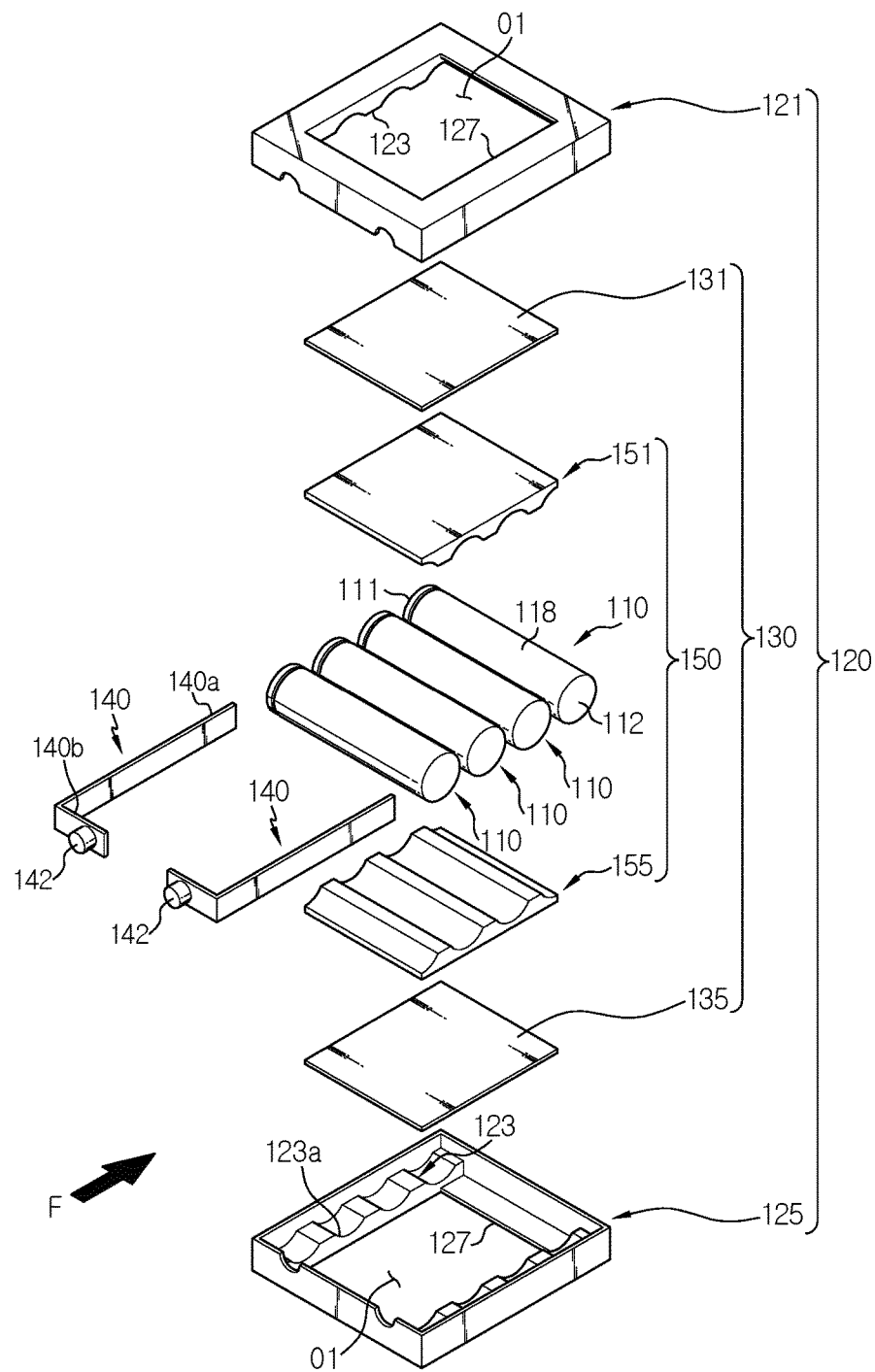
FIG. 2 is an exploded perspective view schematically showing some components of the secondary battery pack according to an embodiment of the present disclosure.

Referring to FIGS. 1 and 2, a secondary battery pack 100 according to the present disclosure may include a plurality of cylindrical battery cells 110, a pack case 120, at least one heat dissipation plate 130, a connection bus bar 140, and a heat transfer pad 150.

Here, the cylindrical battery cell 110 may include a cylindrical battery can 118 and an electrode assembly (not shown) accommodated in the battery can 118.

Here, the battery can 118 may include a material with high electrical conductivity. For example, the battery can 118 may include aluminum or copper.

In addition, when viewed in the F direction, electrode terminals 111, 112 may be formed at both left and right ends of the battery can 118. Specifically, a first electrode terminal 111 may be formed at a flat circular one end surface of one end of the battery can 118, and a second electrode terminal 112 may be formed at the other flat circular end surface of the other end of the battery can 118.

Moreover, an electrode assembly (not shown) may be formed in a structure where a positive electrode and a negative electrode are wound in a jelly-roll form with a separator being interposed therebetween. In addition, a positive electrode tab may be attached to the positive electrode (not shown) and connected to the first electrode terminal 111 at one end of the battery can 118. Further, a negative electrode tab may be attached to the negative electrode (not shown) and connected to the second electrode terminal 112 at the other end of the battery can 118.

Further, the plurality of cylindrical battery cells 110 may be spaced apart from each other by a predetermined distance and arranged in one direction. For example, as shown in FIG. 2, when viewed in the F direction, the first electrode terminal 111 and the second electrode terminal 112 of the plurality of cylindrical battery cells 110 may be disposed at both left and right ends. In addition, the plurality of cylindrical battery cells 110 may be arranged to be spaced apart from each other by a predetermined distance in the front and rear direction.

Specifically, the connection bus bar 140 may include a connection portion 140a elongated in one direction and a bending portion 140b bent and extending from the connection portion 140a. Further, an external input/output terminal 142 may be formed at an end of the bending portion 140b of the connection bus bar 140, which is exposed out of the pack case 120. In addition, the external input/output terminal 142 may have a cylindrical shape protruding outward.

Further, the connection bus bar 140 may electrically connect the plurality of cylindrical battery cells 110 to each other. Also, for this purpose, the connection portion 140a of the connection bus bar 140 may be configured to contact the first electrode terminal 111 or the second electrode terminal 112 formed at the plurality of cylindrical battery cells 110.

Further, the connection bus bar 140 may be configured to contact the electrode terminals 111, 112 of the plurality of cylindrical battery cells 110 to electrically connect the electrode terminals 111, 112 to each other. In this case, the connection bus bar 140 may include a metal with excellent electrical conductivity. For example, the connection bus bar 140 may include nickel, gold, aluminum, copper, or a combination thereof.

Specifically, the connection bus bar 140 may have one end in contact with the first electrode terminal 111 of one cylindrical battery cell 110 and the other end in contact with the second electrode terminal 112 of another cylindrical battery cell 110 so that the first electrode terminal 111 of one cylindrical battery cell 110 and the second electrode terminal 112 of another cylindrical battery cell 110 are electrically connected to each other.

For example, as shown in FIG. 2, three connection bus bars 140 may be provided to electrically connect the first electrode terminal 111 of one cylindrical battery cell 110 and the second electrode terminal 112 of another cylindrical battery cell 110.

Also, the connection bus bar 140 may be configured such that a portion of the connection portion 140a is in contact with the electrode terminal 111 of one cylindrical battery cell 110 and the other portion of the connection portion 140a is in contact with the first electrode terminal 111 of another cylindrical battery cell 110, to electrically connect the first electrode terminal 111 of one cylindrical battery cell 110 and the first electrode terminal 111 of another cylindrical battery cell 110.

Moreover, the connection bus bar 140 may have one end in contact with the second electrode terminal 112 of the one cylindrical battery cell 110 and the other end in contact with the second electrode terminal 112 of another cylindrical battery cell 110 so that the second electrode terminal 112 of one cylindrical battery cell 110 and the second electrode terminal 112 of another cylindrical battery cell 110 are electrically connected.

Further, the connection bus bar 140 may be located to face one end surface or the other end surface of the cylindrical battery cell 110 at which the first electrode terminal 111 or the second electrode terminal 112 is formed. For example, as shown in FIG. 2, two connection bus bars 140 may be provided to electrically connect four cylindrical battery cells 110 in series. Also, the connection portion 140a of one connection bus bar 140 may be located at one side to face the first electrode terminal 111 of the plurality of cylindrical battery cells 110. The other connection bus bar 140 may be located at the other side to face the second electrode terminal 112 of the plurality of cylindrical battery cells 110.

Meanwhile, the pack case 120 may be configured in an integrated form. Alternatively, the pack case 120 may be configured by coupling two members. Also, the pack case 120 may have an accommodation portion 123 in which an empty space is formed to accommodate components such as the cylindrical battery cells 110. For example, as shown in FIG. 2, the accommodation portion 123 may be formed to have an empty space such that four cylindrical battery cells 110 may be accommodated in the pack case 120.

Moreover, the accommodation portion 123 of the pack case 120 may have a placing member 123a on which the plurality of cylindrical battery cells 110 are mounted. In addition, a plurality of concave structures having a dented shape may be formed at the placing member 123a so as to correspond to the outer shape of the ends of the plurality of cylindrical battery cells 110 where the electrode terminals 111 are formed.

Thus, according to this configuration of the present disclosure, since the placing member 123a having a plurality of concave structures are formed at the accommodation portion 123 of the pack case 120, it is possible to prevent the plurality of cylindrical battery cells 110 from moving due to an external impact, thereby reducing a contact failure or a disconnection with the connection bus bar 140 caused by frequent fluctuations.

Moreover, the pack case 120 may include at least one exposing portion 127 having an opening 01 performed therein from an inside to an outside. Specifically, the exposing portion 127 may be perforated at an outer side the pack case 120. For example, as shown in FIG. 1, when viewed in the F direction, the exposing portion 127 may be formed at an upper portion and a lower portion of the pack case 120, respectively.

Further, referring to FIG. 2 again, the pack case 120 may include an upper case 121 and a lower case 125 at which the exposing portion 127 is formed, respectively. Also, the upper case 121 may have an inner structure formed to accommodate and cover the upper portion of the plurality of cylindrical battery cells 110 therein. Further, the lower case 125 may have an upper surface that is coupled with a lower surface of the upper case 121. In addition, the lower case 125 may have an inner structure formed to accommodate and cover the lower portion of the plurality of cylindrical battery cells 110 therein.

Here, the terms indicating directions such as front, rear, left, right, upper and lower directions may be changed depending on the position of an observer or the shape of an object. For the sake of convenience of description, in the present specification, directions are classified into front, rear, left, right, upper and lower directions, based on the F direction.

For example, as shown in FIG. 2, the pack case 120 includes an upper case 121 and a lower case 125. Also, the exposing portion 127 perforated from the inside to the outside may be formed at an upper portion of the upper case 121. Further, the exposing portion 127 perforated from the inside to the outside may be formed at a lower portion of the lower case 125. In addition, the lower portion of the upper case 121 and the upper portion of the lower case 125 may be coupled to each other.

Meanwhile, the heat dissipation plate 130 may be fixedly positioned at the pack case 120 of the present disclosure. Specifically, the heat dissipation plate 130 may be configured in the form of a metal plate. Also, the metal may be a metal with excellent thermal conductivity. For example, the metal may be copper, aluminum, copper alloy, or aluminum alloy.

In addition, the heat dissipation plate 130 may be located at the exposing portion 127 of the pack case 120. That is, the heat dissipation plate 130 may be configured such that at least a portion thereof is exposed to the outside through the exposing portion 127 of the pack case 120. For example, as shown in FIG. 1, the heat dissipation plate 130 may have a rectangular plate shape with a size and shape corresponding to an opening 01 perforated in the exposing portion 127 of the pack case 120.

Also, as shown in FIG. 2, the pack case 120 may include an upper case 121 and a lower case 125. Further, the upper case 121 and the lower case 125 may have the exposing portion 127 perforated from the inside to the outside, respectively. In addition, the first heat dissipation plate 131 and the second heat dissipation plate 135 may be located at the exposing portions 127, respectively, such that the first heat dissipation plate 131 and the second heat dissipation plate 135 having a rectangular plate shape are partially exposed to the outside through the opening 01.

Thus, according to this configuration of the present disclosure, by using the heat dissipation plate 130 and the exposing portion 127 of the pack case 120 capable of exposing at least a portion of the heat dissipation plate 130 to the outside, the heat generated from the cylindrical battery cell 110 may be effectively dissipated to the outside.

Figure 3:
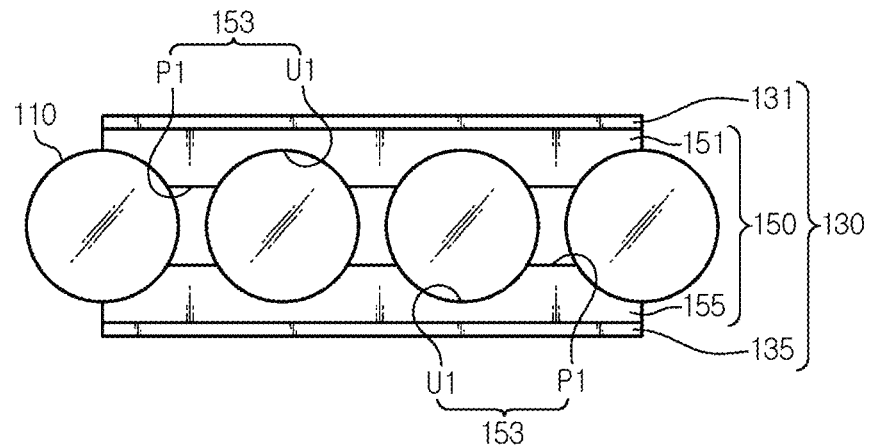
FIG. 3 is a side view schematically showing some components of the secondary battery pack according to an embodiment of the present disclosure.

FIG. 3 is a side view schematically showing some components of the secondary battery pack according to an embodiment of the present disclosure.

Referring to FIG. 3 along with FIG. 2, the heat transfer pad 150 may be in a solid state. For example, the heat transfer pad 150 may be prepared by processing a thermally conductive polymer material in a liquid state into a predetermined shape and then curing the same. In addition, the heat transfer pad 150 may be configured to be interposed between the plurality of cylindrical battery cells 110 and the heat dissipation plate 130. Further, the heat transfer pad 150 may have configured such that one surface thereof contacts the inner surface of the heat dissipation plate 130. In addition, the other surface of the heat transfer pad 150 may be formed to surround a portion of the outer surface of the plurality of cylindrical battery cells 110.

Specifically, the heat transfer pad 150 may include an upper pad 151 formed to surround an upper portion of the plurality of cylindrical battery cells 110 and a lower pad 155 formed to surround a lower portion of the plurality of cylindrical battery cells 110. For example, as shown in FIG. 3, the upper pad 151 may be formed to be interposed between the first heat dissipation plate 131 and the plurality of cylindrical battery cells 110. In addition, the lower pad 155 may be formed to be interposed between the second heat dissipation plate 135 and the plurality of cylindrical battery cells 110.

In addition, the upper pad 151 and the lower pad 155 may respectively have a curved portion 153 having a protruding structure P1 protruding in an inner direction of the secondary battery pack 100 so as to be interposed between the plurality of cylindrical battery cells 110 and a recess structure U1 dented in an outer direction of the secondary battery pack 100.

More specifically, the protruding structure P1 may be shaped to partially fill the gap between the plurality of cylindrical battery cells 110. For example, the protruding structure P1 may be formed to have a width gradually decreasing in the protruding direction, and an outer surface of the protruding structure P1 may have a plane.

In addition, the recess structure U1 of the curved portion 153 formed at each of the upper pad 151 and the lower pad 155 may have an arched structure. For example, as shown in FIG. 2, the curved portion 153 having three protruding structures P1 and four arched recess structures U1 may be formed at four spots in each of the upper pad 151 and the lower pad 155.

Also, the heat transfer pad 150 may include a material with high thermal conductivity at least partially. Here, the heat transfer pad 150 may include a polymer resin, a silicone-based resin or a filler with high thermal conductivity. For example, the polymer resin may be a polysiloxane resin, a polyamide resin, a urethane resin, or an epoxy resin. Moreover, the silicone resin means an artificial polymer compound having a main skeleton by siloxane bonds. For example, as shown in FIG. 3, the upper pad 151 and the lower pad 155 may be in a form where the silicone resin with high thermal conductivity is cured.

Thus, according to this configuration of the present disclosure, since the heat transfer pad 150 made of the thermally conductive material is interposed between the plurality of cylindrical battery cells 110 and the heat dissipation plate 130, the heat generated from the plurality of cylindrical battery cells 110 accommodated in the secondary battery pack 100 may be effectively transferred to the heat dissipation plate 130 through the heat transfer pad 150. Accordingly, the cooling effect of the secondary battery pack 100 may be maximized.

Figure 4:
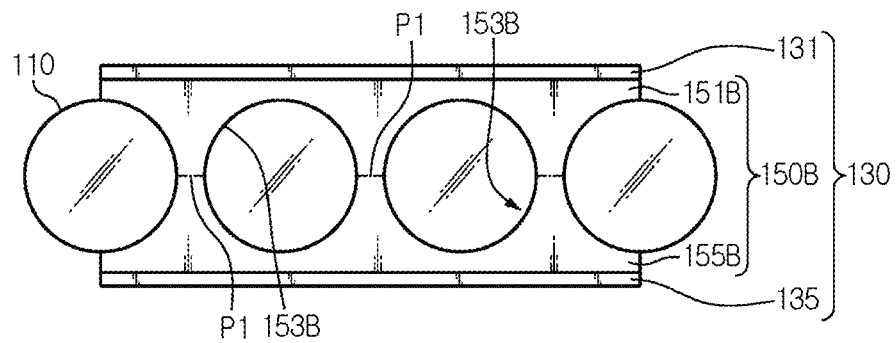
FIG. 4 is a side view schematically showing some components of a secondary battery pack according to another embodiment of the present disclosure.

FIG. 4 is a side view schematically showing some components of a secondary battery pack according to another embodiment of the present disclosure.

Referring to FIG. 4, a secondary battery pack 100 according to another embodiment of the present disclosure may include a heat transfer pad 150B having a different shape from the heat transfer pad 150 of FIG. 3. Specifically, the heat transfer pad 150B may have a curved portion 153B respectively provided to the upper pad 151B and the lower pad 155B. In this case, the protruding structures P1 of the curved portions 153B respectively provided to the upper pad 151B and the lower pad 155B may be located to face each other. Also, the protruding structures P1 respectively formed at the upper pad 151B and the lower pad 155B may be shaped to partially contact each other. That is, the upper pad 151B and the lower pad 155B may be connected to each other to have an integrated form.

For example, as shown in FIG. 4, the heat transfer pad 150B may have an integrated form where the protruding structures P1 of the curved portions 153B respectively provided to the upper pad 151B and the lower pad 155B are connected to each other.

Thus, according to this configuration of the present disclosure, since the protruding structures P1 of the curved portions 153B respectively provided to the upper pad 151B and the lower pad 155B of the present disclosure are located to face each other and are shaped to be partially connected to each other, the contact area of the heat transfer pad 150B surrounding the outer surface of the plurality of cylindrical battery cells 110 may be increased. Moreover, since the gap between the plurality of cylindrical battery cells 110 may be filled with the heat transfer pad 150B, it is possible to prevent the plurality of cylindrical battery cells 110 from being locally overheated due to the heat stagnant by the air in the gap.

Figure 5:
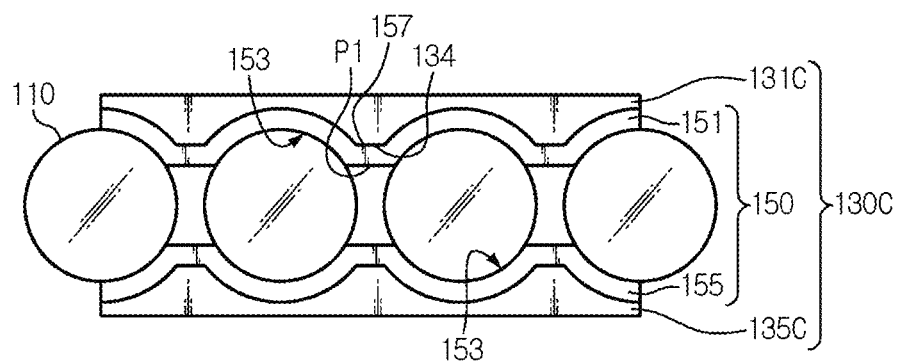
FIG. 5 is a side view schematically showing some components of a secondary battery pack according to still another embodiment of the present disclosure.

FIG. 5 is a side view schematically showing some components of a secondary battery pack according to still another embodiment of the present disclosure.

Referring to FIG. 5, a secondary battery pack 100 according to another embodiment of the present disclosure may include a heat dissipation plate 130C having a different shape from the heat dissipation plate 130 of FIG. 3. Specifically, the heat dissipation plate 130C may have a convex portion 134 ridged in the inner direction of the secondary battery pack 100. Also, the convex portion 134 may be formed at a location corresponding to the protruding structure P1 of the curved portion 153 of the heat transfer pad 150, at an inner surface of the heat dissipation plate 130C. Further, an insert portion 157 dented in the inner direction of the secondary battery pack 100 may be formed at the outer surface of the heat transfer pad 150 facing the heat dissipation plate 130C such that the convex portion 134 is inserted therein.

Moreover, the convex portion 134 may have a shape corresponding to the curved portion 153. That is, the convex portion 134 may have a protruding structure and a recess structure similar to the curved portion 153.

For example, as shown in FIG. 5, the secondary battery pack according to another embodiment of the present disclosure may include a first heat dissipation plate 131C and a second heat dissipation plate 135C. Also, three convex portions 134 ridged in the inner direction of the secondary battery pack 100 may be formed at the inner surfaces of the first heat dissipation plate 131C and the second heat dissipation plate 135C, respectively. Further, the convex portions 134 may be formed at locations of the upper pad 151 and the lower pad 155 corresponding to the protruding structures P1 of the curved portions 153, respectively.

Thus, according to this configuration of the present disclosure, since the convex portion 134 is formed at the inner surface of the heat dissipation plate 130C, the length of the heat transfer path between the heat transfer pad 150 and the heat dissipation plate 130C may be made uniform. That is, a cylindrical battery cell 110 located at the center among the plurality of cylindrical battery cells 110 may be more easily degraded since heat may be accumulated more in the cylindrical battery cell 110 located at the center, compared to a cylindrical battery cell 110 located at a relatively outer side. Accordingly, by forming the convex portion 134 at the heat dissipation plate 130C of the present disclosure, it is possible to reduce the heat transfer distance between the cylindrical battery cell 110 located at the center and the heat dissipation plate 130C, thereby increasing the heat dissipation rate. Accordingly, heat balance may be achieved effectively between the plurality of cylindrical battery cells 110, and the lifespan of the secondary battery pack 100 may be effectively increased.

Figure 6:
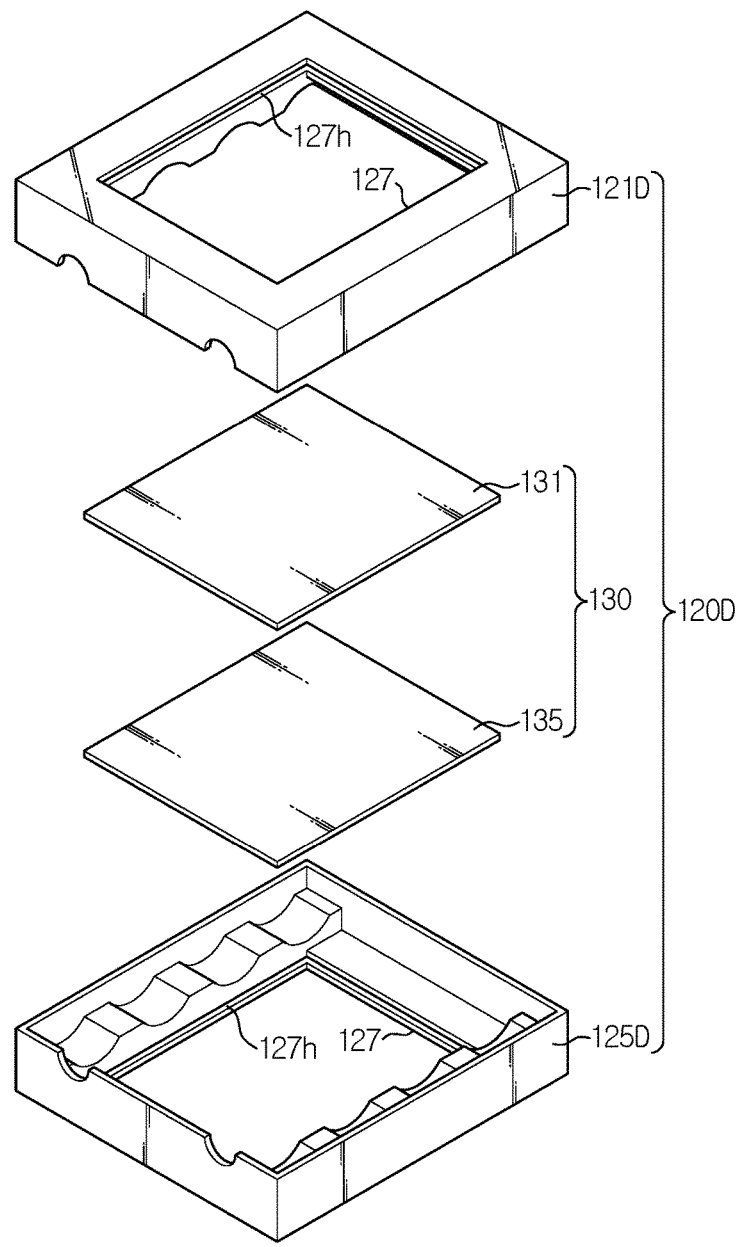
FIG. 6 is an exploded perspective view schematically showing some components of the secondary battery pack according to another embodiment of the present disclosure.
Figure 7:
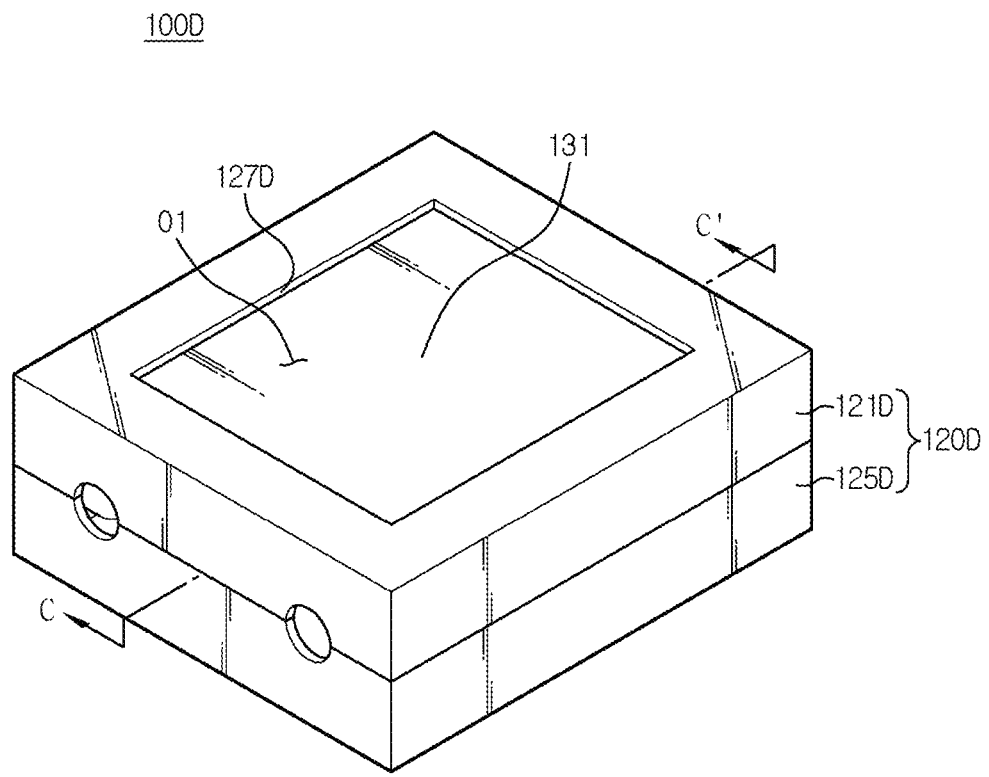
FIG. 7 is a perspective view schematically showing a secondary battery pack according to another embodiment of the present disclosure.

FIG. 6 is an exploded perspective view schematically showing some components of the secondary battery pack according to another embodiment of the present disclosure. FIG. 7 is a perspective view schematically showing a secondary battery pack according to another embodiment of the present disclosure. Also, FIG. 8 is a cross-sectioned view schematically showing the secondary battery pack, taken along the line C-C' of FIG. 7.

Figure 8:
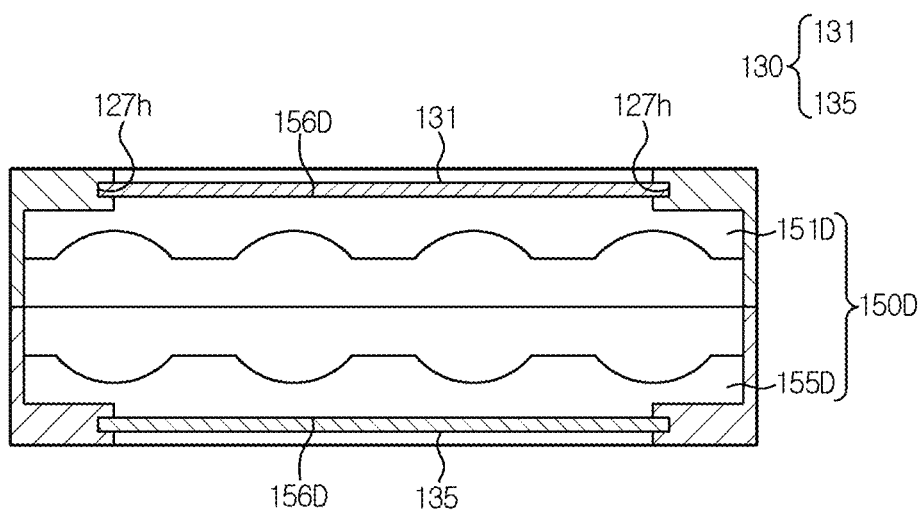
FIG. 8 is a cross-sectioned view schematically showing the secondary battery pack, taken along the line C-C' of FIG. 7.

Referring to FIGS. 6 to 8, the heat dissipation plate 130 may include a first heat dissipation plate 131 and a second heat dissipation plate 135. In addition, an insert groove 127h dented inward may be formed at an inner side of the exposing portion 127 of each of the upper case 121D and the lower case 125D. Specifically, the insert groove 127h may have a dented size such that the outer periphery of each of the first heat dissipation plate 131 and the second heat dissipation plate 135 is inserted and fixed therein.

For example, as shown in FIG. 6, the insert groove 127h may be formed at the inner side of the exposing portion 127. The insert groove 127h may be formed to extend along an inner periphery 127D of the perforated exposing portion 127. Further, as shown in FIG. 8, an outer periphery of each of the first heat dissipation plate 131 and the second heat dissipation plate 135 may be inserted into the insert groove 127h formed at each of the upper case 121D and the lower case 125D.

In this case, the first heat dissipation plate 131 and the second heat dissipation plate 135 may be formed to be inserted into the upper case 121D and the lower case 125D, respectively, by means of insert injection molding. For example, if the upper case 121D and the lower case 125D of the pack case 120D are manufactured by casting, the heat dissipation plate 130 is disposed in a mold in advance, and a molten material of the pack case 120D (e.g., a plastic polymer resin) is injected thereto and cured, thereby manufacturing the heat dissipation plate 130 inserted into the pack case 120D.

Thus, according to this configuration of the present disclosure, since the heat dissipation plate 130 is inserted and fixed in the insert groove 127h formed at the inner surface of the exposing portion 127 of the pack case 120D, the heat dissipation plate 130 may be fixed without a separate fixing member, thereby reducing the material cost. In addition, since the heat dissipation plate 130 is inserted into the pack case 120D and thus is not easily separated due to an external shock, the durability of the secondary battery pack 100 may be greatly improved.

Also, the heat transfer pad 150D of FIG. 8 may have a different shape from the heat transfer pad 150 of FIG. 2. Specifically, the heat transfer pad 150D may include an upper pad 151D and a lower pad 155D. In addition, a support portion 156D protruding outward to contact the inner surface of the heat dissipation plate 130 is formed at the upper pad 151D and the lower pad 155D, respectively.

Further, the support portion 156D may have a size corresponding to the size of the outer surface of the heat dissipation plate 130 exposed through the opening 01 of the exposing portion 127.

For example, as shown in FIG. 8, the heat transfer pad 150D may include an upper pad 151D and a lower pad 155D. In addition, support portions 156D protruding outwardly to respectively contact the inner surfaces of the first heat dissipation plate 131 and the second heat dissipation plate 135 may be formed at the upper pad 151D and the lower pad 155D, respectively.

Thus, according to this configuration of the present disclosure, since the support portion 156D configured to contact the inner surface of the heat dissipation plate 130 is formed at the heat transfer pad 150D of the present disclosure, no empty space may be formed between the heat dissipation plate 130 and the heat transfer pad 150D, thereby not deteriorating the cooling efficiency of the secondary battery pack.

Figure 9:
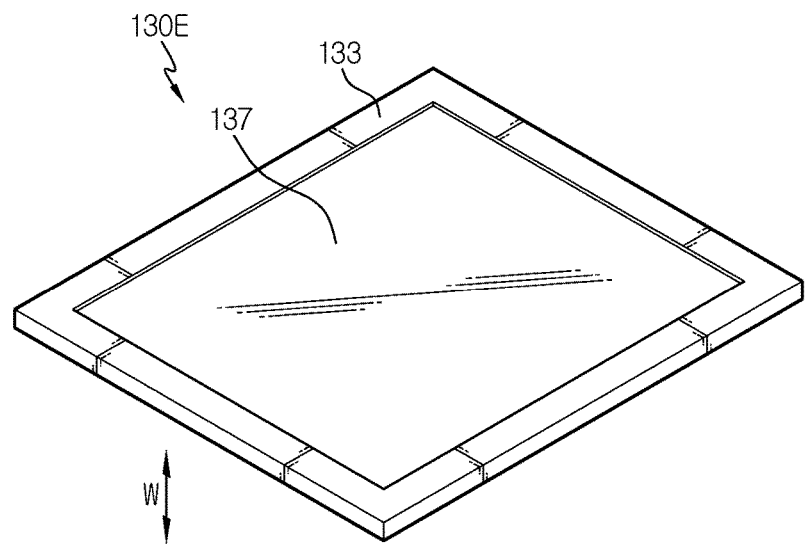
FIG. 9 is a perspective view schematically showing a heat dissipation plate, employed at the secondary battery pack according to another embodiment of the present disclosure.

FIG. 9 is a perspective view schematically showing a heat dissipation plate, employed at the secondary battery pack according to another embodiment of the present disclosure. Also, FIG. 10 is a cross-sectioned view schematically showing a secondary battery pack according to still another embodiment of the present disclosure as in FIG. 8.

Figure 10:
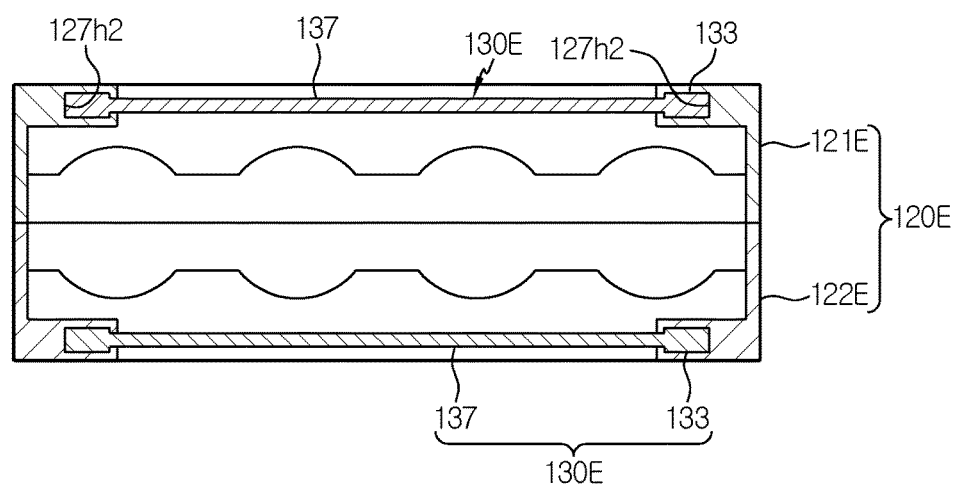
FIG. 10 is a cross-sectioned view schematically showing a secondary battery pack according to still another embodiment of the present disclosure as in FIG. 8.

Referring to FIGS. 9 and 10, an outer periphery 133 of the heat dissipation plate 130E may have a greater plate thickness in the vertical direction W compared to the center portion 137 of the heat dissipation plate 130E. Also, the outer periphery 133 of the heat dissipation plate 130E may have a shape inserted into the pack case 120 through the insert groove 127h2.

Specifically, the heat dissipation plate 130E may have a rectangular plate shape as a whole. In addition, the outer periphery 133 of the heat dissipation plate 130E may have a great thickness that is 1.2 to 2 times or less compared to the center portion 137. Further, a step may be formed between the outer periphery 133 and the center portion 137 of the heat dissipation plate 130E due to the thickness difference.

For example, as shown in FIG. 9, the outer periphery 133 of the heat dissipation plate 130E may have a greater plate thickness than the center portion 137. Also, the outer periphery 133 of the heat dissipation plate 130E may have a rectangular frame shape where the center portion 137 is blocked.

Thus, according to this configuration of the present disclosure, if the outer periphery 133 of the heat dissipation plate 130E formed relatively thicker than the center portion 137 has a shape inserted into the pack case 120, the rigidity of the pack case 120 may be reinforced. That is, since the outer periphery 133 of the heat dissipation plate 130E is configured to support the inside of the pack case 120, it is possible to effectively prevent the pack case 120 from deforming due to external pressure.

Further, the heat dissipation plate 130E may increase the heat capacity to absorb heat as much as the size of the thickened outer periphery 133. Also, since the contact area of the heat dissipation plate 130E with the pack case 120 is increased, the heat generated from the plurality of cylindrical battery cells 110 may be effectively dissipated.

Figure 11:
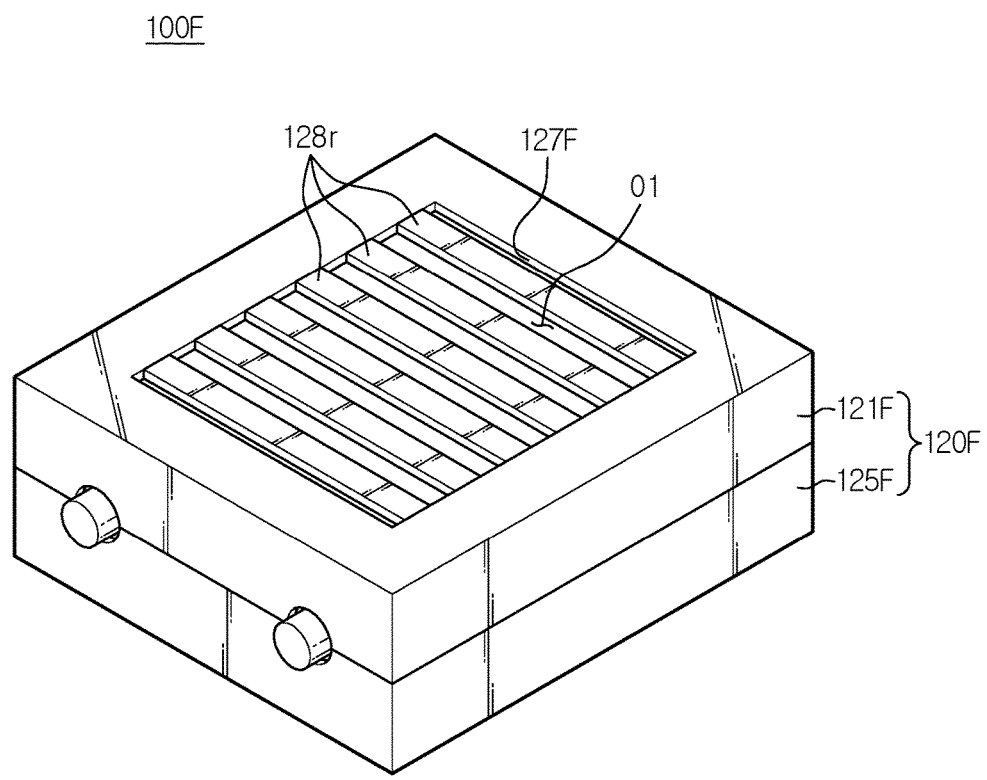
FIG. 11 is a perspective view schematically showing a secondary battery pack according to another embodiment of the present disclosure.

FIG. 11 is a perspective view schematically showing a secondary battery pack according to another embodiment of the present disclosure.

Referring to FIG. 11, the pack case 120F of FIG. 11 may have a different shape form the pack case 120 of FIG. 1.

Specifically, the pack case 120F may include an upper case 121F and a lower case 125F. Also, the upper case 121F and the lower case 125F of the pack case 120F may have at least one exposing portion 127F perforated from the inside to the outside. Further, the exposing portion 127F may be formed at an upper side or a lower side of the pack case 120F. For example, as shown in FIG. 11, the exposing portion 127F may be formed at the upper case 121F and the lower case 125F of the pack case 120F, respectively, when viewed in the F direction.

In addition, at least one rib 128r extending from one side to the other side of the perforated opening 01 may be formed at the exposing portion 127F. Further, if a plurality of ribs 128r are formed, the plurality of ribs 128r may be spaced apart from each other by a predetermined distance. Also, the plurality of ribs 128r may be formed with an area less than 50% of the planar size of the opening 01 perforated in the exposing portion 127F of FIG. 1.

For example, as shown in FIG. 11, six ribs 128r extending from one side to the other side of the perforated opening 01 may be formed at the exposing portion 127F of the pack case 120F. Moreover, the area occupied by the six ribs 128r may be about 50% of the size of the opening 01 perforated in the exposing portion 127F of FIG. 1.

Thus, according to this configuration of the present disclosure, since at least one rib 128r is formed to extend from one side to the other side of the opening 01 perforated in the exposing portion 127F of the pack case 120F, the rigidity of the pack case 120F may be further reinforced, and also it is possible to prevent a user from directly contacting the heat dissipation plate 130 located at the exposing portion 127F of the pack case 120F. Accordingly result, the user of the secondary battery pack 100 may be prevented from being burned while using the secondary battery pack 100, thereby increasing the safety of the secondary battery pack 100.

Figure 12:
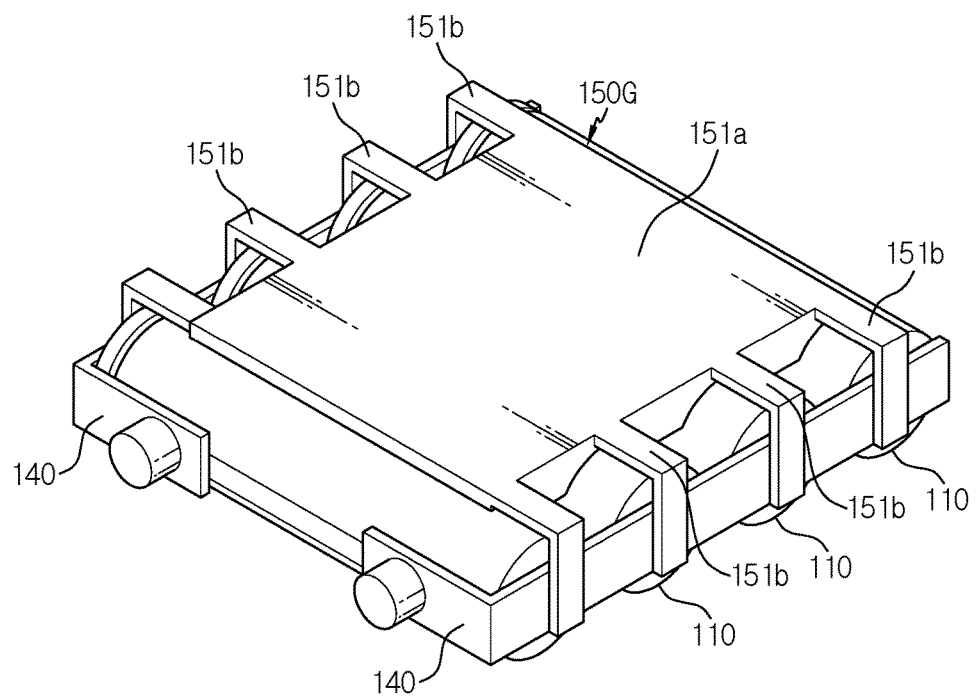
FIG. 12 is a perspective view schematically showing some components of a secondary battery pack according to another embodiment of the present disclosure.

FIG. 12 is a perspective view schematically showing some components of a secondary battery pack according to another embodiment of the present disclosure.

Referring to FIG. 12 along with FIG. 2, a heat transfer pad 150G of the secondary battery pack 100 according to another embodiment of the present disclosure may include a cover portion 151a configured to cover the upper portion of the plurality of cylindrical battery cells 110 and an extending portion 151b extending in the horizontal direction from one side of the cover portion 151a. Specifically, the extending portion 151b may be formed to extend outward to cover a portion where the connection bus bar 140 and the electrode terminals 111 of the plurality of cylindrical battery cells 110 are bonded. For example, as shown in FIG. 12, the heat transfer pad 150G according to another embodiment may include a cover portion 151a configured to cover the upper portion of the plurality of cylindrical battery cells 110 and extending portions 151b respectively extending in a horizontal direction from both left and right ends of the cover portion 151a. Also, the extending portion 151b may be configured to extend outward and then bend downward again to cover the bonded portion of the connection bus bar 140 and the electrode terminals 111 of the plurality of cylindrical battery cells 110.

Thus, according to this configuration of the present disclosure, since the heat transfer pad 150G includes the extending portion 151b extends outward to cover the portion where the connection bus bar 140 and the electrode terminals 111 of the plurality of cylindrical battery cells 110 are bonded, the heat generated at the bonded portion of the connection bus bar 140 and the electrode terminal 111 where a relatively great is generated may be effectively transferred to the heat dissipation plate 130 through the extending portion 151b. Accordingly, the cooling effect of the secondary battery pack 100 may be further enhanced.

In addition, an electronic device (not shown) according to the present disclosure may include the battery pack. For example, the battery pack may be accommodated in an exterior case of the electronic device. Also, the electronic device may be a moving means such as an electric bicycle.

Further, a power tool according to the present disclosure may include the secondary battery pack 100. For example, the power tool may be an electric drill. Also, the secondary battery pack 100 may be coupled to a lower portion of the power tool.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 100: secondary battery pack | 110: cylindrical battery cell |
| 111, 112: electrode terminal | 120: pack case |
| 121, 125: upper case, lower case | 153: curved portion |
| 123: accommodation portion | 127: exposing portion |
| 130: heat dissipation plate | 140: connection bus bar |
| 150: heat transfer pad | 151, 155: upper pad, lower pad |
| 134: convex portion | 157: insert portion |
| 127h: insert groove | 128r: rib |
| 151a, 151b: cover portion, extending portion | |

INDUSTRIAL APPLICABILITY

The present disclosure relates to a secondary battery pack including a heat dissipation plate. Also, the present disclosure is available to industries associated with an electronic device or a power tool equipped with the secondary battery pack.

What is claimed is:

1. A secondary battery pack, comprising:
a plurality of cylindrical battery cells disposed adjacent to each other in a layer in a front-back direction of the secondary battery pack, each cylindrical battery cell arranged in a width direction of the secondary battery pack and having electrode terminals formed at both ends thereof;
a pack case having an accommodation portion at an inside of the pack case to accommodate the plurality of cylindrical battery cells therein, and at least one exposing portion through an upper or lower surface of the pack case exposing the inside to an outside of the pack case;
at least one heat dissipation plate having a metal plate shape and located at the exposing portion of the pack case so that at least an upper or lower surface of the at least one heat dissipation plate is exposed to the outside of the pack case through the exposing portion of the pack case, and the heat dissipation plate being arranged in the front-back direction parallel to the layer of the plurality of the cylindrical battery cells; and a heat transfer pad having a thermally conductive material in a solid state and interposed between the plurality of cylindrical battery cells and the heat dissipation plate, wherein the heat transfer pad includes:

an upper pad extending in the front-back direction parallel to the heat dissipation plate to be over the layer of the plurality of cylindrical battery cells, the upper pad having a lower surface having recessed curved portions to respectively surround and contact upper portions of each of the plurality of battery cells and protruding structures protruding in an inner direction of the secondary battery pack to be respectively interposed between adjacent ones of the plurality of cylindrical battery cells, and a lower pad extending in the front-back direction parallel to the heat dissipation plate to be under the layer of the plurality of cylindrical battery cells, the lower pad having an upper surface having recessed curved portions to respectively surround and contact lower portions of each of the plurality of battery cells and protruding structures protruding in an inner direction of the secondary battery pack to be respectively interposed between adjacent ones of the plurality of cylindrical battery cells, and wherein the heat dissipation plate extends in the front-back direction parallel to and over the heat transfer pad.

2. The secondary battery pack according to claim 1, wherein the upper pad and the lower pad respectively have a curved portion having a protruding structure protruding in an inner direction of the secondary battery pack to be interposed between the plurality of cylindrical battery cells and a recess structure dented in an outer direction of the secondary battery pack.

3. The secondary battery pack according to claim 2, wherein the plurality of cylindrical battery cells are spaced apart from each other by a predetermined distance and arranged in the front-back direction, and wherein the protruding structures of the upper pad and the protruding structures of the lower pad contact each other.

4. The secondary battery pack according to claim 1, wherein a convex portion formed at a location corresponding to the protruding structure of the curved portion and ridged in the inner direction of the secondary battery pack is at an inner surface of the heat dissipation plate, and wherein an insert portion dented in the inner direction of the secondary battery pack is at an outer surface of the heat transfer pad facing the heat dissipation plate so that the convex portion is inserted therein.

5. The secondary battery pack according to claim 1, wherein the pack case includes an upper case and a lower case at which an upper exposing portion and a lower exposing portion among the at least one exposing portion are disposed, respectively, wherein the upper case has an inner structure to accommodate and cover the upper portion of the plurality of cylindrical battery cells therein, and wherein the lower case has an upper surface coupled to a lower surface of the upper case and has an inner structure to accommodate and cover the lower portion of the plurality of cylindrical battery cells.

6. The secondary battery pack according to claim 5, wherein the heat dissipation plate includes a first heat dissipation plate and a second heat dissipation plate, and wherein an insert groove dented inward is at an inner side of the exposing portion of each of the upper case and the lower case so that an outer periphery of each of the first heat dissipation plate and the second heat dissipation plate is inserted and fixed therein.

7. The secondary battery pack according to claim 6, wherein a support portion protruding outward is at each of the upper pad and the lower pad to contact an inner surface of each of the first heat dissipation plate and the second heat dissipation plate.

8. The secondary battery pack according to claim 6, wherein the outer periphery of the heat dissipation plate has a greater plate thickness than a center portion of the heat dissipation plate.

9. The secondary battery pack according to claim 1, wherein at least one rib extends from one side of the exposing portion to an opposing side of the exposing portion.

10. The secondary battery pack according to claim 1, further comprising:

a connection bus bar in contact with the electrode terminals of the plurality of cylindrical battery cells to electrically connect the plurality of cylindrical battery cells.

11. The secondary battery pack according to claim 10, wherein the heat transfer pad has an extending portion extending outward to cover a bonding portion between the connection bus bar and the electrode terminals of the plurality of cylindrical battery cells.

12. The secondary battery pack according to claim 1, wherein a placing member is at the accommodation portion of the pack case so that the plurality of cylindrical battery cells are mounted thereto, and a plurality of concave structures dented corresponding to an outer shape of ends of the plurality of cylindrical battery cells at which the electrode terminals are provided are at the placing member.

13. An electronic device, comprising the secondary battery pack according to claim 1.

14. A power tool, comprising the secondary battery pack according to claim 1.

15. The secondary battery according to claim 1, wherein the upper surface of the at least one heat dissipation plate exposed to the outside of the pack case through the exposing portion is flat.

16. The secondary battery pack according to claim 1, wherein the upper pad has an upper surface having curved portions at locations corresponding to the recessed curved portions of the lower surface of the upper pad and indented portions at locations corresponding to the protruding structures of the upper pad, wherein the lower pad has a lower surface having curved portions at locations corresponding to the recessed curved portions of the upper surface of the lower pad and indented portions at locations corresponding to the protruding structures of the lower pad, wherein the heat dissipation plate includes an upper heat dissipation plate and a lower heat dissipation plate, wherein a lower surface of the upper heat dissipation plate is conformed to the upper surface of the upper pad, and wherein an upper surface of the lower heat dissipation plate is conformed to the lower surface of the lower pad.

17. The secondary battery according to claim 16, wherein the upper surface of the upper heat dissipation plate is exposed to the outside of the pack case through the exposing portion.

18. The secondary battery according to claim 1, wherein the upper surface of the upper heat dissipation plate exposed to the outside of the pack case through the exposing portion is flat.

19. The secondary battery pack according to claim 1, wherein the heat dissipation plate includes an upper heat dissipation plate and a lower heat dissipation plate,
   wherein a lower surface of the upper heat dissipation plate is in contact with and conformed to the upper surface of the upper pad, and
   wherein an upper surface of the lower heat dissipation plate is in contact with and conformed to the lower surface of the lower pad.

* * * * *